United States Patent Office 3,307,628
Patented Mar. 7, 1967

3,307,628
PROCESS FOR SECONDARY RECOVERY OF PETROLEUM USING STABILIZED MICRO-EMULSIONS
Edwin A. Sena, Littleton, Colo., assignor to Marathon Oil Company, Findlay, Ohio, a corporation of Ohio
No Drawing. Filed Apr. 6, 1966, Ser. No. 540,509
7 Claims. (Cl. 166—9)

This application is a continuation-in-part of my co-pending United States patent application Serial No. 259,-352, filed February 18, 1963, and now abandoned.

This invention relates to secondary-type recovery of petroleum fluids and more particularly to a process for using stabilized microemulsions in oil recovery.

Many secondary oil recovery techniques have been evolved through the years. Initially, water was injected into a formation via one well and used to push oil into the vicinity of a second well through which it was recovered. Although many other procedures have been evolved, this simple water flooding technique is still the secondary recovery process of choice. This state of affairs exists because the cost and sweep efficiency of a given flood material govern its acceptance by the oil industry.

The efficiency of an oil recovery process is determined by the amount of oil recovered in flooding operations compared to the amount of oil in the formation at the time flooding is initiated. To have a good efficiency, the mobility of the flooding media should be at its leading edge, at least about that of the crude being displaced; and the flood material should preferentially displace the oil from the rock surfaces or pores in the formation.

I have now discovered that particular microemulsions are especially useful in oil recovery operations, particularly where the use of saline water is required. The microemulsions are also known as transparent emulsions or oleopathic hydromicelles, etc. These compositions form opaque emulsions when diluted with relatively large amounts of water. Microemulsions, as used in the process of this invention, differ from the "soluble oils" utilized heretofore in secondary-type recovery operations for reasons taught in United States Patent 3,254,714. This patent teaches that a series of changes occur on addition of water to anhydrous soluble oils. Initially, viscosity increases and peaks out on continued addition of water. The oil-external microemulsions exist to the wet side of this viscosity and conductivity peak. The microemulsions of this patent are used in the instant process. As noted in the aforementioned patent, the prior art soluble oils of Csaszar contain amounts of water which give them characteristics occurring on the dry side of the aforementioned viscosity peak.

The microemulsions are made up of a petroleum crude or fraction(s) thereof; water; a water-soluble, relatively oil-insoluble surfactant; an oil-soluble, relatively water-insoluble surfactant; and a cosolvent. The microemulsions are prepared by dissolving a water-soluble surfactant and the cosolvent in water; dissolving the oil-soluble surfactant in the oil; and mixing the two solutions.

The amounts of the microemulsion components required vary with the salinity of the water; the crude utilized; the surfactants, per se; and the coupling agent(s) utilized. Generally, only about 5 volume percent each of water-soluble surfactant, oil-soluble surfactant, and cosolvent are utilized in the microemulsions though lesser amounts can be utilized—for example, 3%.

The amount of cosolvent required is about the same as the amount of oil-soluble surfactant utilized, though the ratio of water-soluble surfactant to oil-soluble surfactant can vary from about 2:3 to 3:2. At higher oil-soluble surfactant concentrations, the amount of cosolvent used can be slightly less than the surfactant concentrations—say, about 7%, by volume. The upper amount of surfactants utilized is limited by economic considerations. Ten percent is about the maximum amount of surfactant needed under most conditions.

The water content of the microemulsions varies with the surfactant makeup. Thus, a microemulsion containing 6% oil-soluble surfactant and 4% water-soluble surfactant is a microemulsion at 3550% water concentration, while 55% water can be used without the formation of an emulsion if the percentages of the respective types of surfactants are reversed. The oil concentration in these microemulsions is about 30–50%, depending on the water concentration. Preferably, the microemulsions contain 35–45% oil and are utilized in all instances though a portion of the water—i.e., about 1–15% and preferably 1–10%—can be replaced by a low molecular weight halogenated hydrocarbon to reduce the viscosity of the system.

Sometimes the water or petroleum contains sufficient ions to impart to the system a charge. If a surfactant having a differing charge is utilized to make up a desired microemulsion, then an excess of surfactant, over that normally required, must be added to the composition to overcome the original charge.

The oil fraction of the microemulsions can be made up of crude petroleum—for example, a sweet crude from the Illinois Basin—and petroleum fractions such as kerosene, propane, and pentane. If a sour oil is utilized, the surfactants should be soluble at the pH of the solution.

The surfactants utilized in preparing the microemulsions of this invention can be cationic, anionic, or nonionic. Thus, two nonionic surfactans can be used as the water-soluble and oil-soluble surfactants, an anionic surfactant utilized as a water-soluble surfactant, and a nonionic surfactant utilized as an oil-soluble surfactant. This latter procedure can be reversed or a cationic surfactant can be substituted for the anionic surfactant. In either case, it is not recommended that an anionic surfactant and a cationic surfactant be utilized in the same system.

I prefere to utilize anionic surfactants such as higher alkylaryl monosulfonates, particularly alkylnaphthyl monosulfonates, wherein the alkyl radical contains from about 10 to 20 carbon atoms. The sodium salts of dialkylsuccinates are also particularly desirable surfactants for use in making up my microemulsions. It is preferred that the alkyl radicals of the succinate compounds contain from about 6 to about 10 carbon atoms.

The type of surfactant utilized depends upon the temperature of the formation and the hardness, including salinity, and pH of the connate water and the water used to make up the microemulsion. It would be futile to use a detergent such as sodium oleate in a formation containing relatively high concentrations of calcium and magnesium ions, as the precipitated calcium and magnesium soaps would plug the formation. Similarly, where there is a natural detergent in the crude, a surfactant having a similar ionic charge must be used to avoid precipitating an insoluble reaction product.

Cosolvents which can be used in the invention are preferably low molecular weight alcohols such as methanol or ethanol. Other organic materials such as esters, ketones, amides, etc., having the approximate polar properties of the lower molecular weight alcohols can also be used for this purpose. The cosolvents preferably have up to 3 carbon atoms.

The water which can be utilized in preparing the microemulsions is preferably soft; however, I have found that the system works well with produced water from the Illinois Basin having an ion content as high as about 3.5%. The system is also useful with sea water, though the ion content of the water may have to, in some instances, be changed by passage through an ion exchange column or through a desalting device.

The microemulsions are injected into a subterranean petroleum-containing formation in amounts in excess of about 3 to about 10% of the pore volume of the formation. Water is then injected into the formation, forcing a microemulsion bank through the formation and crude petroleum ahead of the bank.

Carbon tetrachloride is a preferred additive for viscosity reduction. Other useful halogenated hydrocarbons include the Freons, such as tetrafluoromethane, trichlorofluoromethane, and hexafluoroethane; ethylenedichloride; and trichloroethylene. It is preferred that the halogenated hydrocarbon contain 1–3 carbon atoms.

The following specific examples more fully illustrate my invention; but it is not intended that my invention be limited to the exact petroleum constituents, surfactants, alcohols, or procedures utilized. Rather, it is intended that all equivalents obvious to those skilled in the art be included within the scope of my invention as claimed.

*Example I*

A microemulsion useful in secondary oil recovery operations was prepared as follows: first, solution of ethyl alcohol, kerosene, and a mixture of oil-soluble surfactants was prepared; than a solution of water-soluble surfactants and Dedrick-produced water was made up. These two solutions were then mixed with agitation to form the microemulsion. The final "oil" had the following concentration: 4.7% Atpet 200 (an oil-soluble sorbitan partial fatty ester, manufactured by Atlas Chemical Company) and Petronate L (an oil-soluble alkylaryl petroleum sulfonate containing 62% surfactant of 415–430 mol. wt., manufactured by L. Sonneborn Sons, Inc.) in a 1:1 ratio, 50.4% kerosene, 4.7% ethanol, 4.7% of a mixture of water-soluble Triton X–100 (an alkyl phenoxy polyethoxy ethanol having 9–10 oxyethylene units, manufactured by Rohm & Haas) and water-soluble Triton X–152 (a mixture of an alkylaryl polyether alcohol, an organic surfactant having a primary nonionic character, manufactured by Rohm & Haas) in a 1:1 ratio, and 35.5% Dedrick-produced water.

*Example II*

A water-wet Berea sandstone core, 13 cm. long and 0.95 cm. dia. having a total pore volume of 6.185 ml., was mounted for test purposes. When filled with kerosene, the core was found to contain 3.6 ml. of kerosene and 2.6 ml. of water. A 10% slug (0.7 ml.) of the microemulsion of Example I was driven through the core with a water drive and resulted in a 67% oil recovery. The slug also removed the connate water in the swept area of the slug.

*Example III*

A substantially salt-insensitive microemulsion has the following composition: 32% water, 40% oil, 9% carbon tetrachloride, 9% ethanol, 6% Atpet 200, and 4% G3300 (a water-soluble alkylaryl sulfonate surfactant, manufactured by Atlas Chemical Company). This solution has the properties of high viscosity and good miscibility with respect to reservoir fluids. The heavier concentration of lipophilic surfactant gives the fluid more permeability with respect to reservoir oil than connate water.

Now having described my invention, what I claim is:
1. The process comprising mixing to form a water-in-oil microemulsion showing substantially no Tyndall effect and substantially stable to ions in a particular oil-bearing formation (a) amounts of water, (b) hydrocarbon, (c) at least one surfactant which is relatively soluble in oil and relatively insoluble in water and (d) at least one additional surfactant which is relatively soluble in water and relatively insoluble in oil, the surfactants being added in amounts sufficient to form the afore-characterized microemulsion and the said water content being in excess of that amount required to cause a substantial increase in viscosity on addition of the water to an anhydrous oil-surfactant mixture and a peaking or leveling of the viscosity resulting from adding water to the anhydrous system; injecting the said microemulsion into an oil-bearing formation, having at least one each of an injection means and oil-production means drilled therein, through said at least one injection means; thereafter injecting a displacing fluid into said formation through said at least one injection means and finally recovering oil through said at least one production means.

2. The process of claim 1 wherein the mobility of the microemulsion is at least about that of the crude in the formation at its leading edge.

3. The process of claim 1 wherein at least one cosolvent is also mixed with the predetermined portions of water and hydrocarbon.

4. The process of claim 3 wherein the at least one cosolvent is a low molecular weight alcohol.

5. The process of claim 1 wherein the water is saline.

6. The process of claim 1 wherein an amount of a low molecular weight halogenated hydrocarbon is incorporated in the microemulsion to regulate the viscosity thereof.

7. The process of claim 1 wherein the ratio of said oil-soluble surfactant to said water-soluble surfactant is 3:2 to 2:3.

References Cited by the Examiner

UNITED STATES PATENTS

| | | | |
|---|---|---|---|
| 1,875,001 | 8/1932 | Hoel | 252—33.3 |
| 2,356,205 | 8/1944 | Blair | 252—8.55 |
| 3,163,214 | 12/1964 | Csaszar | 166—9 |

CHARLES E. O'CONNELL, *Primary Examiner.*

S. J. NOVOSAD, *Assistant Examiner.*

UNITED STATES PATENT OFFICE
CERTIFICATE OF CORRECTION

Patent No. 3,307,628                          March 7, 1967

Edwin A. Sena

It is hereby certified that error appears in the above numbered patent requiring correction and that the said Letters Patent should read as corrected below.

Column 2, line 9, for "3550%" read -- 35-50% --; line 33, for "surfactans" read -- surfactants --; column 3, line 27, for "than" read -- then --.

Signed and sealed this 29th day of October 1968.

(SEAL)
Attest:

Edward M. Fletcher, Jr.                          EDWARD J. BRENNER

Attesting Officer                                 Commissioner of Patents